United States Patent [19]

Curatolo et al.

[11] Patent Number: 4,732,965
[45] Date of Patent: * Mar. 22, 1988

[54] PROCESS FOR THE MANUFACTURE OF POLYAMIDES FROM DIAMINE AND DIAMIDE UTILIZING UREA AS CATALYST

[75] Inventors: Benedict S. Curatolo, Maple Heights; Robert C. Sentman, Macedonia; Gerald P. Coffey, Lyndhurst, all of Ohio

[73] Assignee: The Standard Oil Company, Cleveland, Ohio

[*] Notice: The portion of the term of this patent subsequent to Feb. 3, 2004 has been disclaimed.

[21] Appl. No.: 809,596

[22] Filed: Dec. 16, 1985

[51] Int. Cl.$^4$ .............................................. C08G 69/28
[52] U.S. Cl. ................................... 528/336; 528/313; 528/315
[58] Field of Search ........................ 528/336, 313, 315

[56] References Cited

U.S. PATENT DOCUMENTS 4,543,407 9/1985 Curatolo et al. .................... 528/336
4,640,976 2/1987 Curatolo et al. .................... 528/336

Primary Examiner—Harold D. Anderson
Attorney, Agent, or Firm—David P. Yusko; John E. Miller; Larry W. Evans

[57] ABSTRACT

Nylon-type polyamides are produced from a diamine and a diamide in contact with a catalyst comprising a urea, thiourea, or derivatives thereof. For example, high quality nylon-6,6 is manufactured by contacting hexamethylenediamine and adipamide in water with urea, thiourea, or derivatives thereof catalyst, at an elevated temperature and pressure.

10 Claims, No Drawings

PROCESS FOR THE MANUFACTURE OF POLYAMIDES FROM DIAMINE AND DIAMIDE UTILIZING UREA AS CATALYST

BACKGROUND OF THE INVENTION

1. Field of the Invention

This invention relates to polyamides. In one aspect, the invention relates to a process for manufacturing polyamides from α,ω-diamine and an α,ω-diamide while in another aspect the inventon relates to a process utilizing urea, thiourea or derivatives of urea and thiourea as a catalyst. In still another aspect, the invention relates to a process for manufacturing nylon-6,6 from hexamethylenediamine and adipamide utilizing a catalyst system comprising urea, thiourea or derivatives of urea and thiourea as catalyst.

2. Description of the Prior Art

It is known in the art that commercially available nylons may be prepared by polymerization of various monomers and combinations of monomers. For example, various nylons may be prepared from the polymerization of diamines with dicarboxylic acids, the polymerization of dinitriles with diamines in the presence of water, the polymerization of aminonitriles in the presence of water, or the polymerization of lactams.

In part, the instant invention deals with nylons resulting from the polymerization from diamines and diamides. Very few references suggest the polymerization of these two monomer types. For example. U.S. Pat. No. 3,900,450 teaches a process for polymerizing amino acids, diamines, dibasic carboxylic acids and other amide forming derivatives in which diamides are specifically included.

In part, the instant invention relates to the use of ureas and thioureas as a polymerization catalyst for diamines and diamides. Recently, Curatolo et al., U.S. Pat. No. 4,543,407 disclosed a process for polymerizing diamines and diamides utilizing an oxygenated phosphorus compound as a catalyst.

Lastly, the instant invention relates to the production of nylon-6,6 from hexamethylenediamine and adipamide. Commercially, nylon-6,6 is produced from hexamethylenediamine and adipic acid. The present invention offers an alternative to the adipic acid route in preparing this most useful polymer.

SUMMARY

Nylon-type polyamides suitable for fibers, plastics, films and molding compounds are produced in a process comprising contacting an α,ω-diamine, and an α,ω-diamide in the presence of a catalyst comprising at least one of urea, thiourea, or a derivative of urea or thiourea. In one embodiment, nylon-6,6 is produced by contacting hexamethylenediamine and adipamide in water and in the presence of a catalyst comprising at least one of urea, thiourea, or derivative of these compounds.

DETAILED DESCRIPTION OF THE INVENTION

Monomers:

The α,ω-diamines here used are of the formula

R'HN - R - NHR'     (I)

where R is a divalent organic radical and each R' is independently hydrogen or a univalent organic radical. R can be a divalent aliphatic, alicyclic or aromatic radical and these radicals can bear one or more inert substituents. Similarly, each R' can be independently a hydrogen or a univalent aliphatic, alicyclic or aromatic radical and each one of these radicals can also bear one or more inert substituents. By the term "inert" is meant that the substituent is essentially nonreactive with the reactants, catalysts and products of the process under process conditions. Typically, R is a divalent $C_1$ to $C_{20}$ aliphatic radical, a divalent $C_5$ to $C_{18}$ alicyclic radical, or a $C_6$ to $C_{12}$ divalent aromatic or aromatic containing radical and preferably R is a $C_2$ to $C_8$ straight chain alkylene radical. Typically, R' is hydrogen or a $C_1$ to $C_{20}$ aliphatic radical, $C_5$ to $C_7$ alicyclic or a phenyl radical. Preferably, R' is hydrogen or a $C_1$ to $C_4$ alkyl radical. Representative diamines include tetramethylene diamine, hexamethylenediamine, p-diaminodicyclohexylmethane, 4,4'-diaminodicyclohexyl ether, 4,4'-diaminodicyclohexyl sulfide, 4,4'-diaminodicyclohexyl sulfone, octamethylene diamine, decamethylene diamine, dodecamethylene diamine, m-xylylenediamine, 1,4-dimethyleneamino-1-phenyl-1,2,3,4-tetrahydronaphthalene and the like. Hexamethylenediamine is an especially preferred diamine.

The diamides here used are of the formula

where R and R' are as previously defined. Representative diamides include malonamide, succinamide, glutaramide, adipamide, terephthalamide and isophthalamide. Adipamide is an especially preferred diamide.

The instant invention is substantially aimed at the production of nylon-type polyamides from diamines and diamides. However, other nylon-type polyamides can also be prepared by the instant process by the polymerization of a major portion of diamines and diamides with a minor portion of other polyamide forming compounds. Representatives of other polyamide forming compounds are lactams, such as caprolactam, valerolactam, undecalactam; amino carboxylic acids; aliphatic and aromatic dicarboxylic acids, such as adipic acid, succinic acid, sebacic acid, isophthalic acid and terephthalic acid; and aliphatic and aromatic dinitriles, such as glutaronitrile, succinonitrile, adiponitrile, suberonitrile, sebaconitrile, 1,10-decane dinitrile, methyl glutaronitrile, α-methylene glutaronitrile and 1,4-dicyano-1-phenyl-1,2,3,4,-tetrahydronaphthalene.

Also polymerizable with the catalyst of the instant invention are omega-aminoamides of the formula

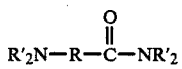

where R and R' are a previously defined.

The Catalyst:

The compounds suitable as catalyst in the instant invention are urea, thiourea and derivatives of urea and thiourea. These urea and thiourea catalysts are of the following general structures:

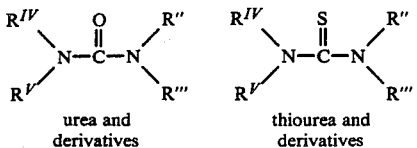

urea and derivatives    thiourea and derivatives wherein R", R'", $R^{IV}$ and $R^V$ are independently hydrogens, $C_1$-$C_{20}$ aliphatic radicals, $C_5$-$C_7$ alicyclic radicals, or phenyl radicals. Preferably R", R'", $R^{IV}$ and $R^V$ are hydrogen or $C_1$-$C_4$ alkyl radicals.

Examples of ureas and thioureas suitable for use as catalysts of this invention include urea, thiourea, 1,1,3,3-tetrabutyl urea, 1,1,3,3-tetramethyl urea and 1,1,3,3-tetramethyl-2-thiourea.

Sufficient catalyst is employed to promote the polymerization of the diamine and diamide. A typical amount of catalyst is between 0.0001 and 1 weight percent, based upon the total weight of the diamine, diamide, and water. Catalyst levels of about 0.001 to about 1 weight percent are preferred.

The manner in which the catalyst is added to the monomers can vary, e.g. addition of each component separately to a mixture of monomers or added as a mixture to one of the monomers prior to admixture with the other monomer.

Process Parameters:

High molecular weight, linear polyamides are prepared by forming a reaction mixture of at least one diamine, at least one diamide, water and catalyst. This reaction mixture can be formed by any one of a number of different methods. One method is the gradual addition, either continuously or incrementally, of the diamine to the diamide over the course of the polymerization. Typically, in this method less than 50 mole percent of the diamine, preferably less than 5 mole percent, is admixed with the diamide with the remainder of the diamine added gradually over the course of polymerization. Another method and one preferred due to its simplicity of operation is a batch addition of all reactants at the commencement of the reaction.

The reaction itself is preferably conducted in a batch mode. However, the reaction can also be conducted in a continuous mode, i.e. continual addition of the reactants with concomitant removal of product, if desired. An example of a continuous mode process is the use of a cascade reactor arrangement.

Theoretically, water is not necessary to the process as reactant, but in practice it has been found that it is beneficial to the production of high molecular weight polyamides. Consequently, water is typically employed in the reaction mixture during the polymerization. Since the water will have to be removed from the reaction product at the end of the polymerization, preferably the amount of water is kept to a minimum (20 weight percent or less) to facilitate ultimate removal. Moreover, the less water present during the polymerization generally means the less energy needed for the process and consequently, less expensive process equipment can be employed. The manner in which the water is initially introduced into the reaction mixture is not important to the practice of this invention and it can thus be either added alone or in combination with the diamine or diamide. Additionally, other solvents or diluents may be used in the process as an alternative to water.

Ammonia is a byproduct of the reaction of the diamine and diamide. As a consequence, ammonia is constantly being generated within the reaction mixture but it typically enters the vapor phase and is preferably continuously removed from reaction zone (e.g. released through a pressure relief valve on the reaction vessel). The concentration of ammonia in the reaction mixture (which is a liquid) can vary from threshold detection limits up to about 5 weight percent of the total weight of the reaction mixture. Preferably, the concentration of ammonia in the liquid reaction mixture does not exceed 1 weight percent and more preferably, is kept as low as possible.

In one embodiment of this invention, high quality nylon-6,6 resin is prepared from hexamethylenediamine and adipamide in water by continuously removing substantially all of the ammonia generated during the polymerization but while retaining all of the water. The water is eventually removed from the reaction system after low molecular weight polyamides are formed.

The polymerization of a diamine and a diamide to form a high molecular weight, linear polyamide is best conducted over a temperature/pressure profile that varies over the course of the polymerization. The temperature/pressure profile will, of course, vary with the specific reactants employed as well as with such factors as the nature and amount of catalysts, mode of operation (batch versus continuous), configuration of the reaction vessel, etc. For the manufacture of nylon-6,6 from hexamethylenediamine and adipamide in water, a temperature/pressure profile comprising at least two stages is typically employed, both preferably conducted in the absence of air ($O_2$). During the first stage of the polymerization, the temperature is maintained at 180°-300° C., preferably 200°-270° C., under autogenous pressure (typically about 200 to about 800 psi absolute) for a period of time sufficient to form low molecular weight polyamides, e.g. polyamides having a weight average molecular weight of less than about 10,000, generally less than about 5,000 as measured by intrinsic viscosity. Ammonia is removed from the reaction vessel while maintaining the water concentration at a level sufficient to aid polymerization, typically in excess of 14 weight percent. At the completion of the first stage (which is the start of the second stage), the pressure is gradually reduced to atmospheric or subatmospheric pressure and the temperature is gradually increased, preferably to between about 260°-295° C. During this second stage, relatively low molecular weight polyamides are combined to form the high molecular weight polyamides that constitute the final product of the process. The second stage is typically concluded with a sweep or purge of the reaction vessel with a flow of inert gas, such as nitrogen.

In one embodiment of this invention, the molecular weight of the polyamide can be increased by performing the polymerization at a temperature just below the lowest temperature at which either the catalyst, monomers or final polyamide begin to degrade.

Although the polymerization is initially conducted at autogenous pressure with a later reduction to atmospheric or subatmospheric pressure, the process can be conducted at constant pressure by applying an inert gas pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

The Polyamide:

The polyamides produced by this invention are solid high molecular weight products having a nylon structure, i.e. amide linkages (—CONH—) as an integral part of the polymer backbone, as opposed to polyacrylamides which have an essentially all carbon backbone. These polyamides can be used in any application calling for the use of a nylon-type polymer. For example, these polyamides can be used as fibers, plastics, films and molding compounds.

The polyamides produced by this invention are characterized by relatively high onset decomposition temperatures (ODT). This property is directly related to the stability of the polymer, the higher the ODT, the more thermally stable the polyamide. Typically, the polyamides produced by this invention have an ODT higher than about 330° C. which is of economic value in the marketplace since such polyamides will undergo less thermal degradation during processing. For example, fiber spinning apparatus will require less down time for cleaning when processing a relatively high ODT polyamide than when processing a lower ODT polyamide. In addition, thermal gravimetric analysis (TGA) shows that the polyamides made by this invention have relatively low weight loss.

The polyamides produced by this invention are believed to contain few, if any, defect structures. A defect structure is simply a branch or side chain attached to the polymer backbone which is formed when a monomer, oligomer or low molecular weight polymer attaches to the polymer backbone as a pendent substituent rather than as an integral part of the backbone itself. Although these defect structures may be present in relatively low concentrations, even in extremely low concentrations, even parts per million, their presence can confer undesirable thermal instability to the polyamide. The practice of this invention reduces the formation of defect structures to the polyamide to a minimum.

This invention is particularly well adapted to manufacturing high quality nylon-6,6 polymer from hexamethylenediamine and adipamide, in contact with the catalyst and water. However, this invention is also useful for the manufacture of nylon-4,4 nylon-4,6; and nylon-6,4 (from the appropriate diamines and diamides).

The following examples are illustrative of various embodiments of this invention. Unless noted to the contrary, all parts and percentages are by weight.

SPECIFIC EMBODIMENTS

EXAMPLES 1-3

All examples were run in a Parr autoclave (450 ml) equipped with an anchor agitator. The reactor was charged with adipamide (72.09 g. 0.5 moles) hexamethylenediamine (58.15 g, 0.5004 moles), water (33.51 g, 1.86 moles) and catalyst. The reactor was then purged with nitrogen, sealed and connected to a back-pressure regulator adjusted to 750 psi absolute. The reaction mixture was then heated with stirring to 260° C. The reaction temperature/pressure profile was as follows: Five minutes at 260° C. and 750 psi. 15 minutes at 260°-280° C. while venting to atmospheric pressure, and then 10 minutes at 260°-280° C. with the reactor swept with nitrogen. The reactor was then cooled to room temperature under a positive nitrogen pressure. Nylon-6,6 polymer was recovered from the reactor and ground to a size such that it would pass through a ten mesh (U.S. Standard) screen. Melting point and onset decomposition temperature (ODT) was measured by differential scanning calorimetry (DSC). Weight loss was measured by thermal gravimetric analysis (TGA). Intrinsic viscosity was determined in formic acid (90 weight percent) at 25° C. Bulk viscosity was the time required for 0.415 g of polymer dissolved in 2 ml of 90 percent formic acid to traverse 0.8 ml in a 1 ml pipette at room temperature.

Identification of catalysts and the results are reported in Table I.

TABLE I
NYLON-6,6 PREPARATION FROM ADIPAMIDE AND HEXAMETHYLENEDIAMINE UTILIZING AN UREA CATALYST

| Example Number | Catalyst | Catalyst Conc. (Mole %) | Bulk Viscosity (Seconds) | Intrinsic Viscosity (DL/G) | TGA WT Loss (%) 325-390° C. | DSC Onset Decomp. Temp Degrees C | DSC Melting Point (°C.) |
|---|---|---|---|---|---|---|---|
| 1 | none | — | 11.97 | 0.74 | 2.2 | 360 | 264 |
| 2 | 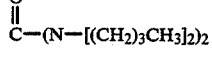 | 0.146 | 22.01 | 0.87 | 2.95 | 370 | 265 |
| 3 | 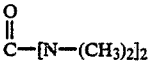 | 0.146 | 14.59 | 0.84 | 4.1 | 375 | 265 |

Since viscosity is proportional to molecular weight. Table I illustrates that polyamides produced from diamines and diamides using the catalytic process of the instant invention have greater viscosities and consequently greater molecular weight than polyamides produced using an identical process without a catalyst.

Although the invention has been described in considerable detail through the preceding examples, these examples are for the purpose of illustration only and one skilled in the art will understand that variations and modifications can be made without departing from the spirit and scope of the invention.

The claimed invention is:

1. A process for the manufacture of a polyamide comprising contacting at least one α,ω-diamine, at least one α,ω-diamide and a catalyst comprising a urea, thiourea, or a derivative of urea or thiourea, at an elevated temperature and pressure; wherein the urea, thiourea and derivatives of urea and thiourea are selected from the group consisting (A) urea and derivatives thereof having the structure

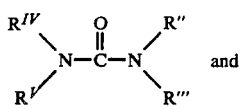

(B) thiourea and derivative thereof having the structure

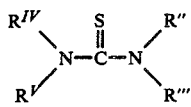

wherein R", R''', $R^{IV}$ and $R^V$ are each independently hydrogen, a $C_1$–$C_{20}$ aliphatic radical, a $C_5$–$C_7$ alicyclic radical or a phenyl radical.

2. The process of claim 1, wherein the α,ω-diamine, the α,ω-diamine and the catalyst are contacted in water.

3. The process of claim 1 wherein R", R''', $R^{IV}$ and $R^V$ are each independently hydrogen or a $C_1$ to $C_4$ alkyl radical.

4. The process of claim 1 wherein the catalyst is selected from the group consisting of urea, thiourea, 1,1,3,3-tetrabutyl urea, 1,1,3,3-tetramethyl urea and 1,1,3,3-tetramethyl-2-thiourea.

5. The process of claim 2 where the catalyst is present in an amount between about 0.0001 to about 1 weight percent based upon the total weight of the diamine, diamide and water.

6. The process of claim 1 where the diamine is of the formula

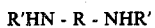

and where the diamide is of the formula

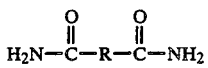

where each R is independently a divalent organic radical and each R' is independently hydrogen or a univalent organic radical.

7. The process of claim 6 where R is a $C_1$ to $C_{20}$ divalent aliphatic radical, a $C_5$ to $C_{18}$ divalent alicyclic radical, or a $C_6$ to $C_{12}$ divalent aromatic or aromatic containing radical; and each R' is independently hydrogen, a $C_1$ to $C_{20}$ univalent aliphatic radical, a $C_5$ to $C_7$ univalent alicyclic radical, or a phenyl radical.

8. The process of claim 7 where R is a $C_2$ to $C_8$ straight chain alkalene radical and R' is hydrogen or a $C_1$ to $C_4$ alkyl radical.

9. The process of claim 8 where the diamine is hexamethylene diamine and the diamide is adipamide.

10. The process of claim 1 wherein a major portion of diamine and diamide and a minor portion of at least one other polyamide forming compound is contacted with the catalyst at an elevated temperature and pressure, wherein the other polyamide forming compound is selected from the group consisting of lactams; aliphatic or aromatic dicarboxylic acids; aliphatic or aromatic dinitriles; amino carboxylic acids; and omega-aminoamides.

* * * * *